Oct. 11, 1932.   R. F. PEO   1,881,959
COUPLING FOR RELATIVELY MOVABLE MEMBERS
Filed May 7, 1931
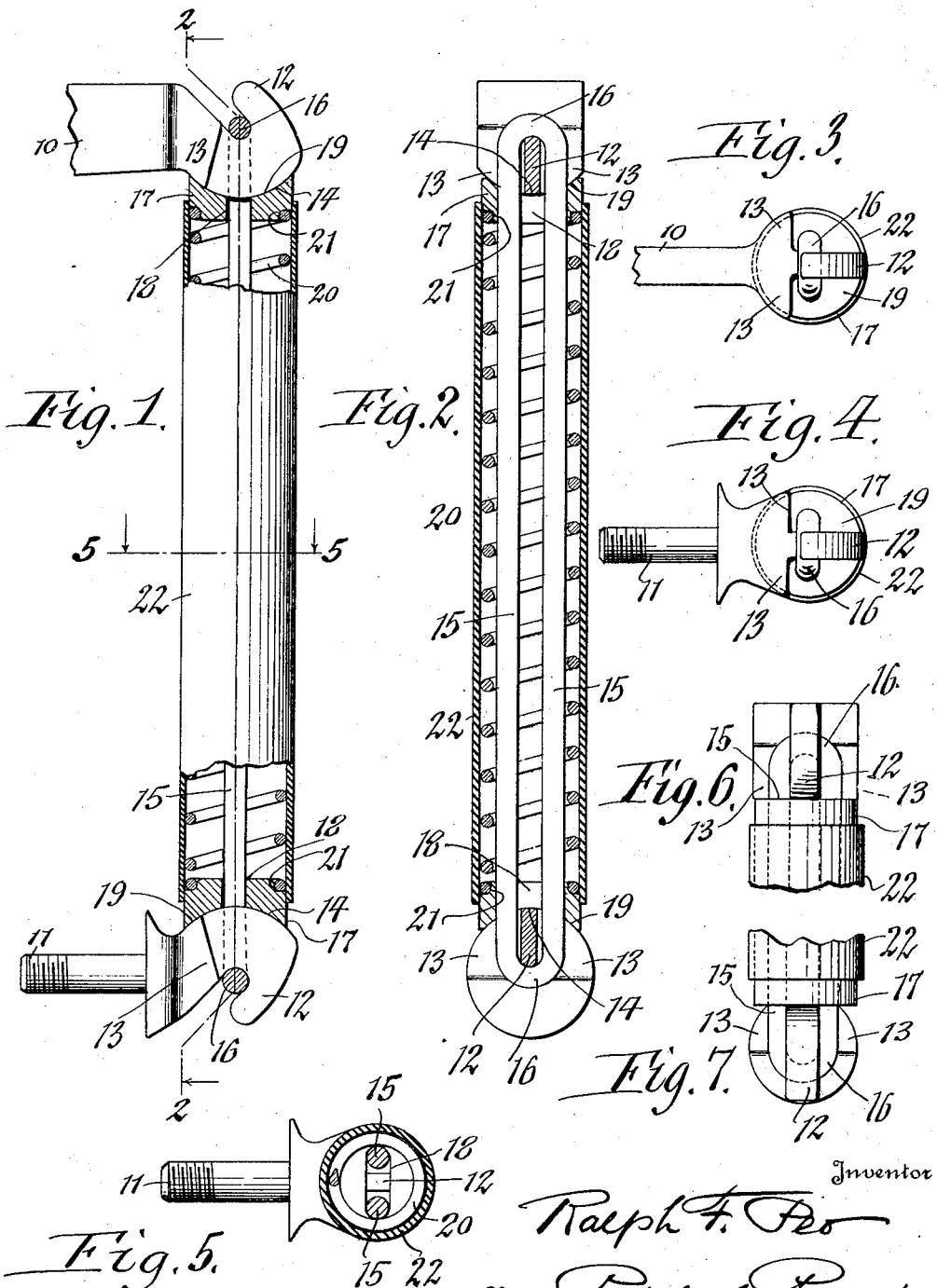
Inventor
Ralph F. Peo
By Popp & Powers
Attorneys Patented Oct. 11, 1932

1,881,959

UNITED STATES PATENT OFFICE

RALPH F. PEO, OF BUFFALO, NEW YORK, ASSIGNOR TO HOUDE ENGINEERING CORPORATION, OF BUFFALO, NEW YORK, A CORPORATION OF NEW YORK

COUPLING FOR RELATIVELY MOVABLE MEMBERS

Application filed May 7, 1931. Serial No. 535,679.

This invention relates generally to a coupling which is adapted to be used for connecting two relatively movable members and more particularly to such a coupling which is known as a "drag link" for use between the axle of an automobile and the operating arm or lever of a shock absorber which is mounted on the frame of the automobile for the purpose of absorbing the shock between this axle and frame during the operation of the car.

It is the object of this invention to provide a coupling for such shock absorbers or for use in similar installations where two parts move relatively to each other, which coupling is of simple and inexpensive construction, efficient in operation, not liable to get out of order, and presents a neat and finished appearance.

In the accompanying drawing:

Figure 1 is a side elevation, partly in section, of an approved form of coupling embodying my improvements.

Figure 2 is a longitudinal section of the same taken on line 2—2 Fig. 1.

Figure 3 is a top plan view of the same.

Figure 4 is a bottom plan view thereof.

Figure 5 is a transverse section taken on line 5—5 Fig. 1.

Figures 6 and 7 are fragmentary front elevations of the upper and lower parts of this coupling.

Similar characters of reference indicate like parts in the several figures of the drawing.

Although this coupling may be used in various places for connecting two relatively movable members it will be assumed in the present case that the same is employed as a drag link between the operating arm or lever 10 of a hydraulic shock absorber which is mounted on one part of an automobile, for example the frame thereof, and a bolt 11 which is mounted on an axle of the automobile, which axle and frame move toward and from each other while the car is running over uneven roadway.

For the present purposes the operating lever 10 and the bolt 11 will be regarded as the shank of an attaching member or hook, each of which is provided with a forwardly extending beak 12 and two ears or lugs 13 projecting laterally from opposite sides of the base or inner end of the beak where the same joins the respective shank. The beak and the two ears of each hook together form substantially a trident, the prongs of which are arranged substantially equidistant radially around a common center so that the back sides of the beak and the two ears of each hook provide a three-point bearing surface. This three-point bearing surface on the back of the beak and ears of each hook is preferably of spherical form, as shown at 14 in Figs. 1 and 2, for a purpose which will presently appear.

When the two hooks of the shanks 10 and 11 are installed on the relatively movable parts of an automobile or elsewhere, these hooks are so turned that the backs of the same are opposed to each other, while the mouths of the same open outwardly or away from each other, as best shown in Fig. 1.

These two hooks are operatively connected with each other by means of a tie which is provided at its opposite ends with eyes which are engaged respectively with the beaks of the hooks by inserting the same into the mouths thereof.

In the preferred construction of this tie the same has the form of an elongated loop or link so as to provide two longitudinal connecting rods 15 and two turns 16 which connect opposite corresponding ends of the rods and practically form coupling eyes with said rods at the extremities thereof. These eyes are engaged respectively with the beaks of the two hook members, sufficient play being provided between each of these hooks and the respective eye both transversely and lengthwise of the respective hook so as to permit each eye to swing both lengthwise and laterally relatively to the respective hook and thus practically form a universal joint between the same which permits the tie to adapt itself to varying positions of the two coupling hooks relative to each other, while the parts are in use, and avoids any cramping action between the parts during operation.

This tie is preferably made from a rod of metal of suitable diameter so as to form one continuous or unbroken piece, thereby forming a connection between the two hook members which is very strong and durable so as to properly take care of any strains which may be imposed upon the same and yet is very light so that the same is compact and capable of being produced at low cost.

In order to maintain the eyes of the tie member reliably in engagement with the coupling hooks and prevent disengagement thereof, and avoid rattling between the same while the device is in use, spring means are provided which operate to constantly press the coupling hooks outwardly relatively to the eyes of the tie so that the bight of the hooks remains constantly in engagement with the inner sides of the eyes on the tie.

Various means may be provided for this purpose but those shown in the drawing are preferred and are constructed as follows:

The numeral 17 represents two washers which surround the opposite end portions of the tie and engage, respectively, with the inner or back sides of the hooks. Each of these washers is provided with a diametrical slot 18 for the reception of the two longitudinal rods 15, 15 of the tie and on its outer side each of these washers is provided with a concave bearing surface 19 which engages with the convex bearing surface 14 on the back of the respective hook. By this means a spherical or ball and socket joint is formed between each washer and the respective hook of the coupling which permits this washer to turn or slide in all directions on the back side of the hook in adapting itself to the changing position of the tie while the latter swings on this hook, thereby forming a universal connection between these parts which avoids any cramping or noisy action while the device is in use.

These two washers are yieldingly held in engagement with the two hooks by means of a helical spring 20 which surrounds the two rods 15, 15 of the tie and bears at its opposite ends against the opposing inner sides of the washers, as shown in Figs. 1 and 2. In order to maintain the washers in a central position with reference to the spring 20 each of these washers is provided on its inner side adjacent to its margin with a peripheral rabbet 21 in which the adjacent endmost turn of the spring 20 is seated and thereby hold the spring out of engagement from the rods of the tie and avoid any wear or squeaking noise.

In order to enclose the spring and the adjacent parts of the tie and washers and thereby exclude dirt and dust therefrom and also finishing the coupling as a whole so that the same presents a neat appearance, a covering for the spring and associated parts is provided which preferably is made in the form of a tube or tubular boot 22 which surrounds the spring and the central part of the tie and has its opposite ends fitted around the washers 17 outwardly beyond the rabbets 21 of the latter.

This covering may be constructed of any suitable (preferably) flexible material such as rubber, leather or a woven fabric which has the necessary resilience to permit the two coupling hooks to shift their position relatively to each other and still form an enclosure for the spring and the intermediate parts of the tie and washers which is of simple construction and not liable to wear rapidly while in use.

The fit between the opposite ends of the tubular covering 22 and the periphery of the washers is very snug so as to exclude dirt, dust and rain, which fit is preferably effected by making the internal diameter of the tubular covering somewhat smaller than the external diameter of the washers and thereby necessitate slightly stretching or springing the ends of the covering over the washers in order to connect these parts, thereby maintaining the same in the proper relation without any extra fittings, as well as presenting a neat and finished appearance of the device as a whole when completely assembled.

By providing the triangular bearing surface between the backs of the hooks and the washers ample sidewise as well as an angular longitudinal deflection is permitted between these parts without any tendency to disassemble and at the same time provide a proper support for the spring which is interposed in a compressed condition between these washers for holding the latter firmly in engagement with the coupling hooks.

In practice the hooks may be tinned very heavily thereby providing a metallic lubricant which will be noiseless under operating conditions for a long time.

Inasmuch as the washers and the hooks which are attached to the axle and body of the automobile may be cast to size and shape without requiring any expensive finishing, the cost of manufacturing this coupling as a whole is very low, and as none of the parts are of a delicate character the same is not liable to get out of order while in use.

I claim as my invention:

1. A coupling for connecting relatively movable members comprising hooks each having a shank, a beak projecting forwardly from the shank and two ears projecting laterally from the shank at the base of said beak, said hooks having their backs arranged on the inner sides thereof and opposing each other and having their mouths opening outwardly, and the back side of the beak and ears of each hook forming a three point bearing; a tie provided at its opposite ends with eyes engaging with said hooks, respectively; washers mounted on said tie and each engaging with the three bearing points on the back side of one of said hooks; and spring means interposed between said washers.

2. A coupling for connecting relatively movable members comprising hooks each having a shank, a beak projecting forwardly from the shank and two ears projecting laterally from the shank at the base of said beak, said hooks having their backs arranged on the inner sides thereof and opposing each other and having their mouths opening outwardly, and the back side of the beak and ears of each hook forming a spherical convex bearing surface; washers having concave bearing surfaces engaging the convex surfaces of said hooks, a tie connecting said hooks; and spring means interposed between said washers.

3. A coupling for connecting relatively movable members comprising hooks each having a shank, a beak projecting forwardly from the shank and two ears projecting laterally from the shank at the base of said beak, said hooks having their backs arranged on the inner sides thereof and opposing each other and having their mouths opening outwardly, and the back side of the beak and ears of each hook forming a spherical three point convex bearing surface on the back side of the beak and cheeks of each hook; a tie having eyes at its opposite end engaging with the beaks of said hooks; and spring means interposed between said washers.

4. A coupling for connecting relatively movable members comprising hooks adapted to be mounted on said members, respectively, and having their mouths opening away from each other and their backs opposing each other; a tie having the form of an elongated loop providing eyes at its opposite ends which engage with said hooks, washers engaging the backs of said hooks; and spring means interposed between said washers.

5. A coupling for connecting relatively movable members comprising hooks adapted to be mounted on said members, respectively, and having their backs opposing each other; a tie connecting said hooks; washers surrounding said tie and bearing against the backs of said hooks, respectively; a spring surrounding the tie and engaging its opposite ends with said washers; and a flexible tubular covering surrounding said tie and spring and fitting at its opposite ends to said washers, respectively.

6. A coupling for connecting relatively movable members comprising hooks adapted to be mounted on said members, respectively, and having their backs opposing each other; a tie connecting said hooks; washers surrounding said tie and bearing against the backs of said hooks, respectively; a spring surrounding the tie and engaging its opposite ends with said washers; and a flexible tubular covering surrounding said tie and spring and fitting at its opposite ends to said washers, respectively, each of said washers being provided with a diametrical slot for the reception of one end of said tie and an annular rabbet which receives one end of said spring.

7. The combination with two members to be connected, of a tie link, means forming an interhooking connection between said members and the ends of said tie links, the opposed sides of said members being formed to provide convex bearing surfaces, washers having concave faces for engaging said convex surfaces, and a compression spring interposed between said washers for exerting pressure against said members to maintain the interhooking connection between said members and tie link.

In testimony whereof I hereby affix my signature.

RALPH F. PEO.